(12) United States Patent
Lesso et al.

(10) Patent No.: US 10,720,171 B1
(45) Date of Patent: Jul. 21, 2020

(54) AUDIO PROCESSING

(71) Applicant: Cirrus Logic International Semiconductor Ltd., Edinburgh (GB)

(72) Inventors: John Paul Lesso, Edinburgh (GB); Gordon Richard McLeod, West Lothian (GB)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/280,288

(22) Filed: Feb. 20, 2019

(51) Int. Cl.
*G06F 17/00* (2019.01)
*G10L 19/16* (2013.01)
*G10L 19/005* (2013.01)
*G10L 21/038* (2013.01)

(52) U.S. Cl.
CPC ............ *G10L 19/16* (2013.01); *G10L 19/005* (2013.01); *G10L 21/038* (2013.01)

(58) Field of Classification Search
CPC ...... G10L 19/16; G10L 19/005; G10L 21/038
See application file for complete search history.

(56) References Cited

U.S. PATENT DOCUMENTS

| | | | | |
|---|---|---|---|---|
| 6,801,898 | B1 * | 10/2004 | Koezuka | G10L 21/04 704/500 |
| 2018/0082689 | A1 * | 3/2018 | Khoury | G10L 17/04 |
| 2018/0218749 | A1 * | 8/2018 | Fejgin | G11B 27/034 |
| 2019/0362057 | A1 * | 11/2019 | Keret | G10L 17/04 |

* cited by examiner

*Primary Examiner* — Joseph Saunders, Jr.
(74) *Attorney, Agent, or Firm* — Jackson Walker L.L.P.

(57) ABSTRACT

In a method of audio processing, a plurality of audio samples are received, and are concatenated to form a composite audio signal. The composite audio signal is analysed to identify audio artefacts associated with concatenation in the composite audio signal, and any identified audio artefacts are compensated for, to form a corrected composite audio signal. The corrected composite audio signal is provided to a voice biometrics module.

36 Claims, 9 Drawing Sheets

AUDIO PROCESSING

TECHNICAL FIELD

Embodiments described herein relate to methods and devices for processing audio signals.

BACKGROUND

Many devices include microphones, which can be used to detect ambient sounds. In many situations, the ambient sounds include the speech of one or more nearby speakers. Audio signals generated by the microphones can be used in many ways. For example, audio signals representing speech can be used as the input to a speaker recognition system, allowing a user to control a device or system using spoken commands.

In a speaker recognition system, a user enrols by providing a sample of their speech, and this is used to form a model of the speech, also known as a voice print. Then, during subsequent speaker recognition attempts, samples of speech are compared with the model.

Alternatively, a user may enrol in a speaker recognition system by providing a plurality of samples of their speech, and these samples may then be used to form a model of the speech. For example, a plurality of samples of a user's speech may be received from multiple different sessions where the user has provided speech to the system. In some examples, a provided plurality of samples may be "stitched" or concatenated together to form a composite sample of the user's speech, and the composite sample may then be used to form a model of the speech.

The processes of "stitching" and concatenating a plurality of samples together to form a composite sample of a user's speech may also be used, for example, for a plurality of samples that have been received from a speaker diarisation process. The composite sample of the user's speech that is formed may then be used in a speaker verification process.

However, the processes of "stitching" and concatenating may introduce audio artefacts (for example, "pops" or "clicks") in the composite sample. Similarly, "stitching" or concatenating separate audio samples together may introduce audio artefacts (for example, "pops" or "clicks") in a composite audio signal. For example, during a concatenation process, an audio sample may be "cut" in such a manner that an artificially fast edge is created within the audio sample.

Additionally, audio artefacts may be introduced into an audio signal as a result of switching a microphone either on or off, or audio artefacts may be introduced into an audio signal when that audio signal is truncated.

This introduction of audio artefacts in a composite audio signal may result in problems in speaker recognition and other voice biometric systems. For example, in an automatic speaker recognition system, the presence of an audio artefact introduced into a composite sample of a user's speech may result in the misfiring of a voice activity detector. Additionally or alternatively, during a speaker enrolment process in a voice biometrics system, the presence of an audio artefact introduced into a composite sample of a user's speech may result in the voice biometrics system "learning" the audio artefact as a discriminative part of a user's speech. In other words, the audio artefact may be introduced into a model of the user's speech.

SUMMARY

According to an aspect of the present invention, there is provided a method of audio processing, the method comprising: receiving a plurality of audio samples; concatenating the plurality of audio samples to form a composite audio signal; analysing the composite audio signal to identify audio artefacts associated with concatenation in the composite audio signal; compensating for the identified audio artefacts to form a corrected composite audio signal; and providing the corrected composite audio signal to a voice biometrics module.

The step of analysing the composite audio signal to identify audio artefacts associated with concatenation in the composite audio signal may comprise identifying a pop or click in the composite audio signal.

The step of analysing the composite audio signal to identify audio artefacts associated with concatenation in the composite audio signal may comprise: monitoring an energy level of the composite audio signal; monitoring a rate of change of a tracking envelope of the composite audio signal; and identifying audio artefacts associated with concatenation based on both the monitored energy level of the composite audio signal and the monitored rate of change of the energy level of the composite audio signal.

The step of monitoring an energy level of the composite audio signal may comprise forming an energy tracking envelope of the composite audio signal.

The step of monitoring a rate of change of the energy level of the composite audio signal may comprise: forming a signal tracking envelope of the composite audio signal; and determining a rate of change of the signal tracking envelope of the composite audio signal. The signal tracking envelope may have a faster attack time constant than the energy tracking envelope.

The step of monitoring an energy level of the composite audio signal may comprise forming an energy tracking envelope of the composite audio signal, and the step of identifying audio artefacts associated with concatenation based on both the monitored energy level of the composite audio signal and monitored rate of change of the energy level of the composite audio signal may then comprise: determining whether a parameter of the energy tracking envelope exceeds a first threshold level; determining whether the rate of change of the signal tracking envelope exceeds a second threshold level; and, responsive to the parameter of the energy tracking envelope not exceeding the first threshold level, and the rate of change of the signal tracking envelope exceeding the second threshold level, identifying an audio artefact.

The second threshold level may be set based on a maximum expected slew rate of the composite audio signal.

The step of monitoring an energy level of the composite audio signal may comprise forming an energy tracking envelope of the composite audio signal, and the step of identifying audio artefacts associated with concatenation based on both the monitored energy level of the composite audio signal and monitored rate of change of the energy level of the composite audio signal may then comprise: determining whether the ratio of the rate of change of the signal tracking envelope and a parameter of the energy tracking envelope exceeds a third threshold level; and, responsive to the ratio of the rate of change of the signal tracking envelope and the parameter of the energy tracking envelope exceeding the third threshold level, identifying an audio artefact.

The method may further comprise: reversing the composite audio signal; and analysing the reversed composite audio signal to identify audio artefacts associated with concatenation in the composite audio signal.

The plurality of audio samples may represent speech. For example, the plurality of samples representing speech may be received from a speaker diarisation process. As another example, the plurality of samples representing speech may comprise a plurality of utterances received from multiple different sessions where an individual has provided speech to the system.

The step of compensating for the identified audio artefacts to form a corrected composite audio signal may comprise applying a time-variable gain to the composite audio signal. The time-variable gain may comprise a Gaussian profile.

The method may further comprise using the corrected composite audio signal in a speaker enrolment process.

The method may further comprise using the corrected composite audio signal in a speaker verification process.

According to another aspect of the disclosure, there is provided a system for audio processing, the system comprising: an input for receiving a plurality of audio samples; a processor, wherein the processor is configured for: concatenating the plurality of audio samples to form a composite audio signal; analysing the composite audio signal to identify audio artefacts associated with concatenation in the composite audio signal; and compensating for the identified audio artefacts to form a corrected composite audio signal; and an output for providing the corrected composite audio signal to a voice biometrics module.

The system may further comprise a voice biometrics module connected to said output. According to another aspect of the disclosure, there is provided a computer program product, comprising a tangible computer-readable medium, containing instructions for causing a suitably programmed processor to perform a method comprising: receiving a plurality of audio samples; concatenating the plurality of audio samples to form a composite audio signal; analysing the composite audio signal to identify audio artefacts associated with concatenation in the composite audio signal; compensating for the identified audio artefacts to form a corrected composite audio signal; and providing the corrected composite audio signal to a voice biometrics module.

This has the advantage that audio artefacts may be removed from the signal before processing by the biometrics module.

BRIEF DESCRIPTION OF DRAWINGS

For a better understanding of the present invention, and to show how it may be put into effect, reference will now be made to the accompanying drawings, in which:—

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems. However, for ease of explanation of one embodiment, an illustrative example will be described, in which the implementation occurs in a smartphone.

The methods described herein are suitable for processing any audio signal, or any composite audio signal, including speech signals.

Figure 1:
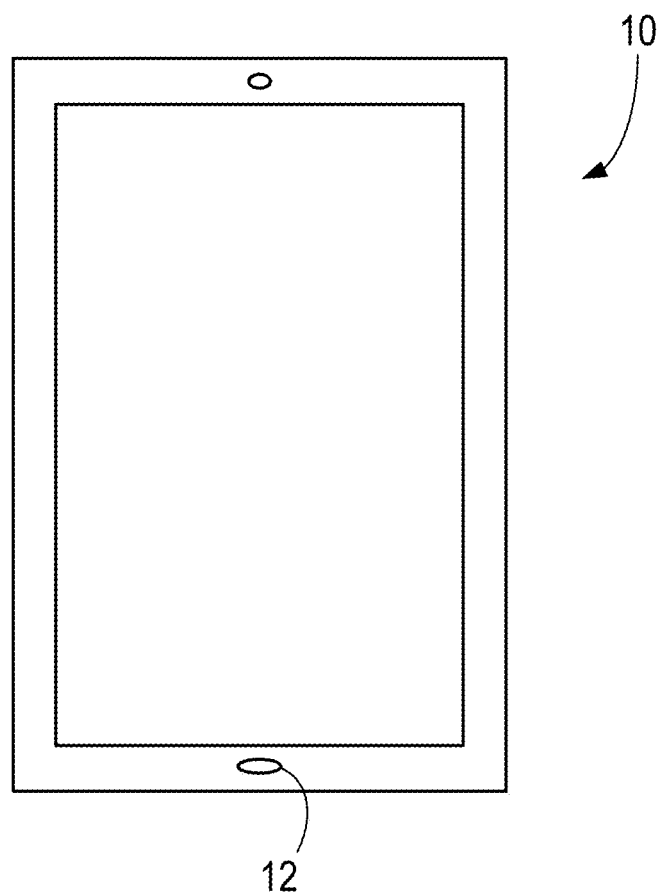
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
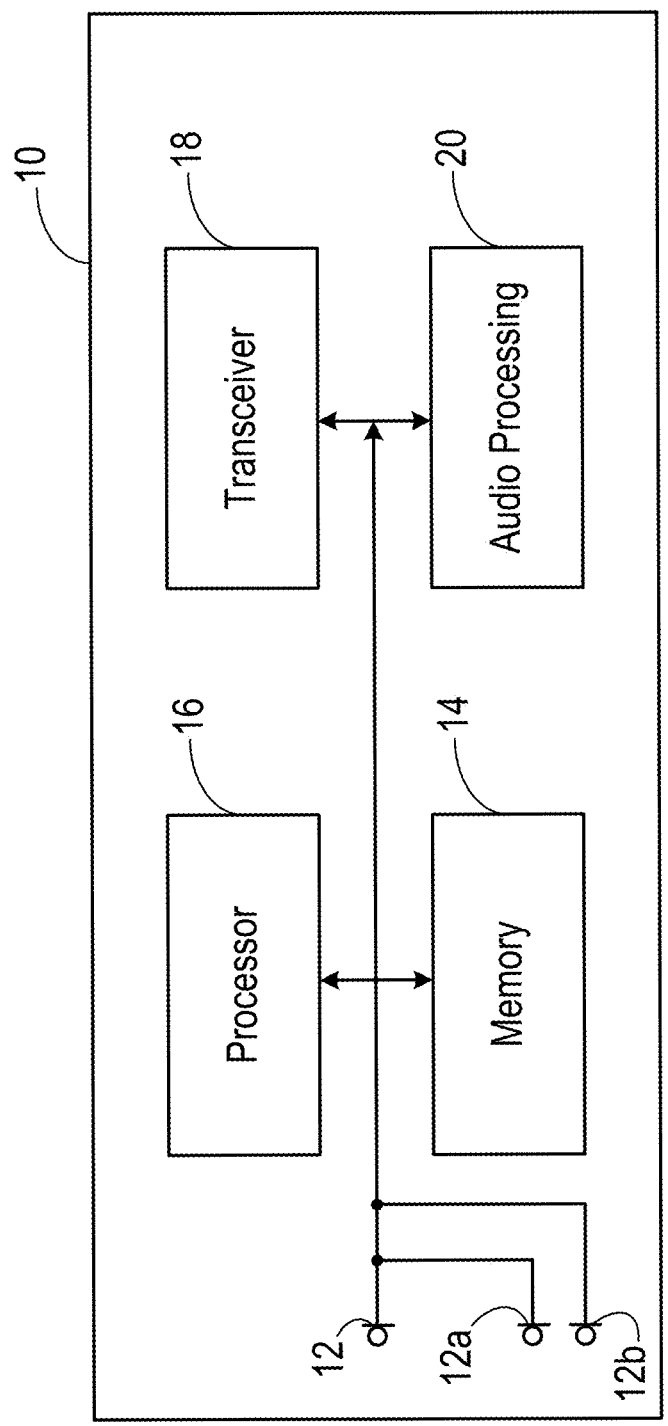
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device In other embodiments, the speech recognition is also performed on the smartphone 10.

Embodiments of the invention may be used in a variety of audio processing systems, including speech and speaker recognition systems.

In some embodiments, the smartphone 10 may be provided with a plurality of samples of a user's speech. These samples may be used to form a model of the speech of the user. Alternatively, these samples may be used to verify the identity of the user who provided the speech. In some embodiments, a plurality of samples of a user's speech may be received from multiple different sessions where the user has provided speech to the system. In some examples, the provided plurality of samples may be "stitched" or concatenated together to form a composite sample of the user's speech, and the composite sample may then be used to form a model of the speech of the user. Alternatively, the composite sample may then be used to verify the identity of the user who provided the speech.

Figure 3:
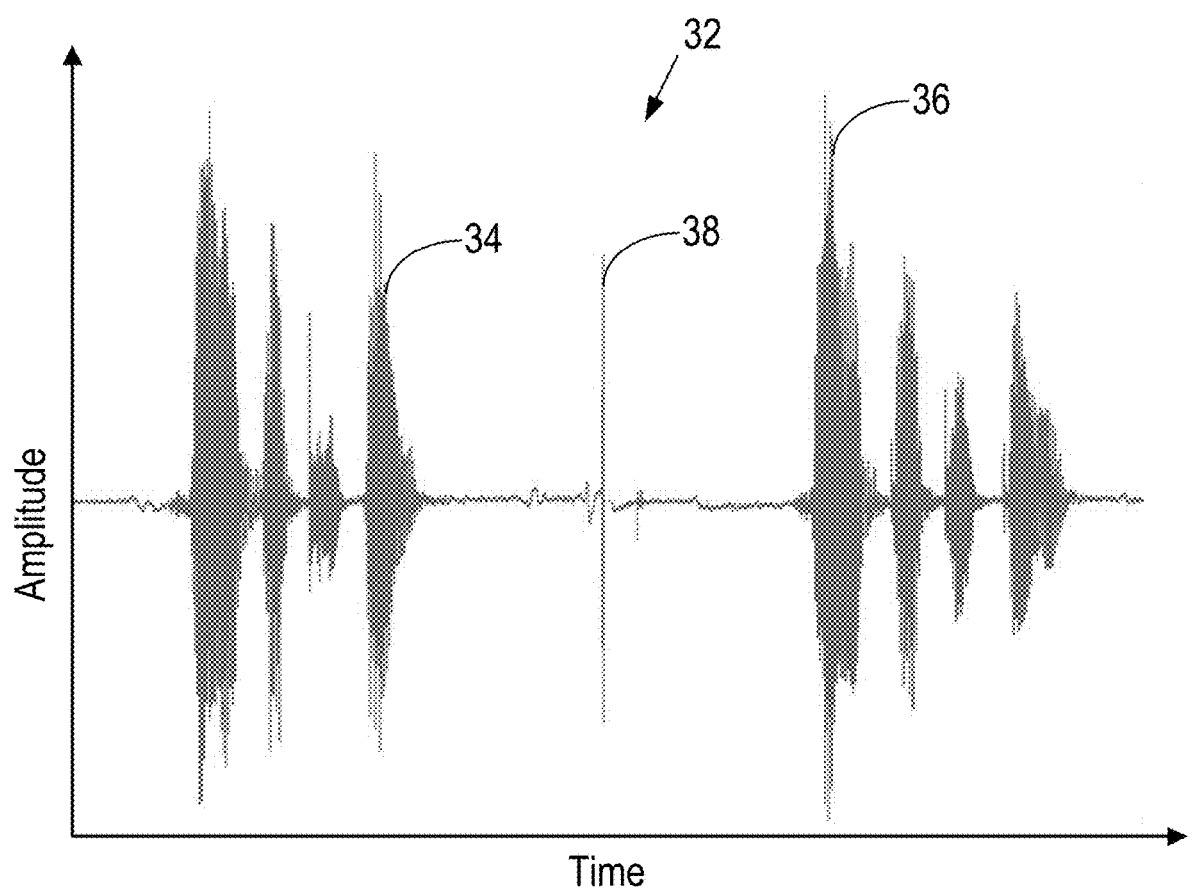
FIG. 3 is an example of a composite sample of a user's speech.

FIG. 3 is an example of a composite sample that has been formed following the concatenation of two samples of a user's speech.

FIG. 3 illustrates a composite sample 32 that has been formed following the concatenation of a first sample of a user's speech 34, and a second sample of a user's speech 36. For example, as part of a speaker recognition process, the first sample 32 and the second sample 34 may result from different utterances by a speaker. As illustrated in FIG. 3, as a result of the concatenation process, an audio artefact 38 has been formed in the composite sample 32, between the first sample 34 and the second sample 36. The audio artefact 38 is associated with a concatenation process. In some examples, an audio artefact may comprise a "pop" or a "click", for example any high-frequency audio artefact or any signal that contains broadband energy not associated with speech.

Alternatively or additionally, a "pop", "click", or another audio artefact (similar to the audio artefact 38 illustrated in FIG. 3), may also be formed if a sample of a user's speech is truncated. Thus, audio artefacts may also be present in samples of a user's speech that are not used in a "stitching" or a concatenation process.

Alternatively or additionally, a "pop", "click", or another audio artefact (similar to the audio artefact 38 illustrated in FIG. 3), may also be formed when a microphone (for example microphone 12 of smartphone 10) which is receiving a sample of a user's speech is turned on, or turned off.

For example, the microphone 12 may be turned off at a time where the user is speaking (as opposed to a time where the user is silent), and this turning off (and subsequent sudden stop in the microphone 12 receiving a speech signal) may result in the sample of the user's speech received by the microphone comprising an artificially fast edge. In other words, an artificially fast edge may be formed in an audio signal when the signal drops from some relatively significant magnitude to a relatively low magnitude over a relatively small number of sample periods. In another example, the microphone 12 may be turned on at a time where the user is speaking, and this turning on (and subsequent sudden reception by the microphone 12 of a speech signal) may result in the sample of the user's speech received by the microphone comprising an artificially fast edge. In other words, an artificially fast edge may be formed in an audio signal when the signal rises from a relatively low magnitude to some relatively significant magnitude over relatively a small number of sample periods.

In general, it is possible to define the maximum expected slew rate for a signal, on the assumption that it will be made up of sinusoids with a range of frequencies. We know the peak value of the signal, for example v, and we also know that, for audio signals, the maximum frequency, f, may be 8 kHz for example. The maximum slew rate, sr, is given by the product $2.\pi.f.v$, and therefore we can assume that any signal that changes more quickly than that maximum slew rate is probably not part of the intended audio signal, and can be regarded as an artefact.

Thus, audio artefacts may also be present in samples of a user's speech that are not used in a "stitching" or a concatenation process.

Figure 4A:
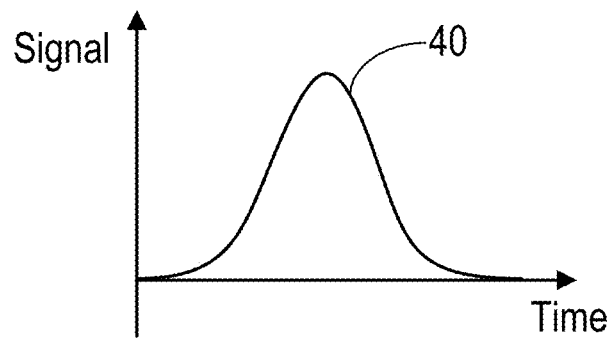
FIGS. 4(a), 4(b), and 4(c) are examples of how audio artefacts may be introduced in a processed audio signal.
Figure 4B:
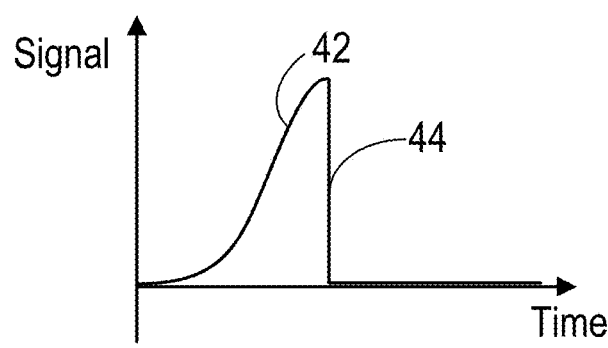
Figure 4C:
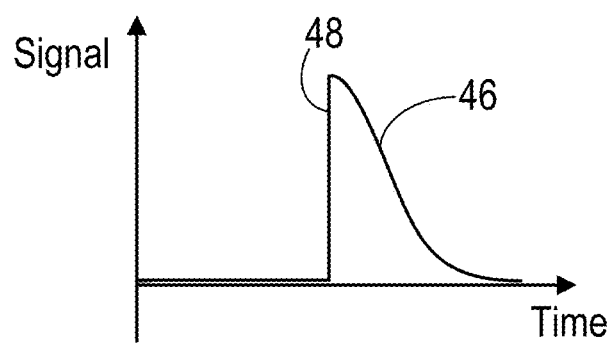

FIGS. 4(a), 4(b), and 4(c) illustrate how audio artefacts may be introduced in an audio signal as a result of processing said audio signal.

FIG. 4(a) illustrates a short section of an audio signal 40. In some examples, the audio signal 40 may represent speech.

FIG. 4(b) shows an audio signal 42, as an illustrative example of an audio signal that comprises an audio artefact that may be perceived as a click, as a result of processing a signal such as the audio signal 40. In this example, the audio signal 42 has an artificially fast edge 44. The fast edge 44 may have resulted from the microphone being turned off while the signal was at a non-zero amplitude, as described above. Alternatively, the fast edge 44 may have resulted from clipping or truncation of the audio signal 40 to form the audio signal 42. The artificially fast edge 44 produces an audible artefact when the signal 42 is reproduced. In each of these examples, the audio artefact may be associated with a concatenation process. The audio artefact may be described as a "clip at end" event, which occurs when, as a result of processing an audio signal, the amplitude of the audio signal decreases from a significant amplitude to relatively low amplitude over a relatively small number of sample periods, such that the maximum expected slew rate is exceeded.

FIG. 4(c) shows an audio signal 46, as an illustrative example of an audio signal that comprises an audio artefact that may be perceived as a pop, as a result of processing a signal such as the audio signal 40. In this example, the audio signal 46 has an artificially fast edge 48. The fast edge 48 may have resulted from the microphone being turned on while the signal was at a non-zero amplitude, as described above. Alternatively, the fast edge 48 may have resulted from clipping or truncation of the audio signal 40 to form the audio signal 46. The artificially fast edge 48 produces an audible artefact when the signal 46 is reproduced. In each of these examples, the audio artefact may be associated with a concatenation process. The audio artefact may be described as a "clip at start" event, which occurs when, as a result of processing an audio signal, the amplitude of the audio signal increases from a relatively low amplitude to a significant amplitude, for example from −30 dB to a full-scale signal, over a relatively small number of sample periods, such that the maximum expected slew rate is exceeded.

As mentioned above, the introduction of audio artefacts in audio signals may result in problems following the further processing or use of said audio signals. Thus, a method and system which can reliably identify and compensate for audio artefacts within audio signals is desirable.

Figure 5:
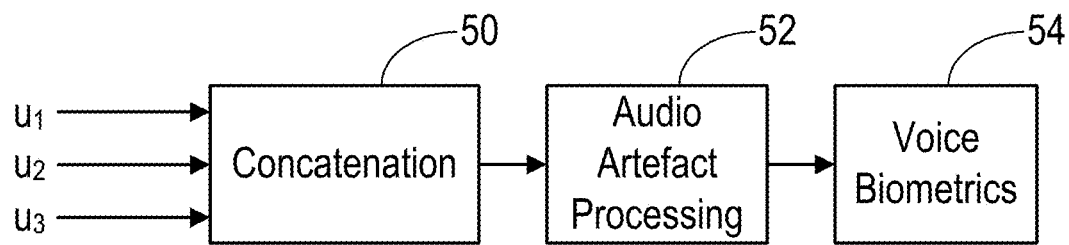
FIG. 5 is a block diagram illustrating functional blocks in a speaker recognition system.
Figure 6:
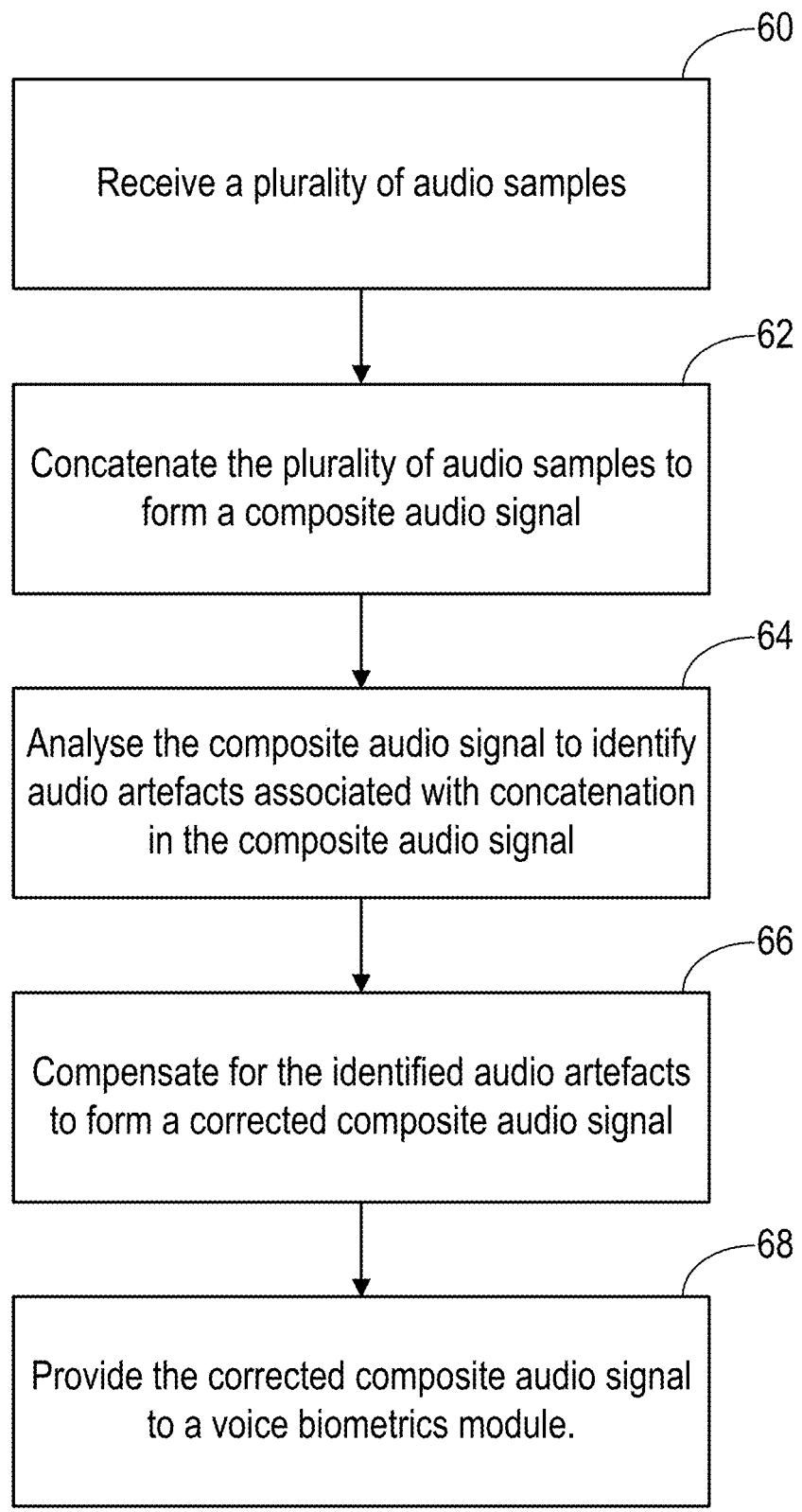
FIG. 6 is a flow chart, illustrating a method of processing an audio signal.

FIG. 5 is a block diagram illustrating the functional blocks in a speaker recognition system, and FIG. 6 is a flow chart, illustrating a method of processing an audio signal.

It will be appreciated that although FIG. 5 illustrates a speaker recognition system, the methods described herein can be implemented in a wide range of audio processing systems, and are suitable for processing a wide range of audio signals.

As shown in FIG. 5, a plurality of samples of an audio signal, u1, u2, u3, are received at a concatenation block 50. In this example, the plurality of samples of an audio signal comprise a plurality of samples representing speech. The plurality of samples representing speech may be detected by a microphone (for example, microphone 12). In some examples, the plurality of samples representing speech may be received from a speaker diarisation process. In some examples, the plurality of samples representing speech may comprise a plurality of utterances received from multiple different sessions where an individual has provided speech to the system.

Thus, in step 60 in the method of FIG. 6, a plurality of audio samples are received.

At the concatenation block 50, the received plurality of samples representing speech undergo a process associated with concatenation. For example, the process associated with concatenation may comprise any of the following: concatenating the plurality of samples representing speech to form a composite sample representing speech (i.e. adding a new sample after a previous sample has ended); "stitching" the plurality of samples representing speech to form a composite sample representing speech (i.e. fading down one sample as it ends, and at the same time fading up the start of a new sample); truncating one or more of the plurality of samples representing speech and, following truncating one or more of the plurality of samples representing speech, "stitching" or concatenating the plurality of samples representing speech. The process associated with concatenation is therefore used to form a composite sample representing speech.

Thus, in step 62 in the method of FIG. 6, the plurality of audio samples are concatenated to form a composite audio signal.

The composite sample representing speech may then be passed to an audio artefact processing block 52. The audio artefact processing block 52 may be configured to analyse a composite audio signal to identify audio artefacts associated with concatenation in the composite audio signal. It will be appreciated that the audio artefact processing block 52 may be configured to analyse a composite audio signal to identify audio artefacts associated with concatenation in the composite audio signal using any suitable method. In this example, the audio artefact processing block 52 is configured to analyse a composite sample representing speech. As described above, audio artefacts associated with concatenation may comprise any of the following: pops, clicks, audio artefacts formed as a result of a concatenation process to form a composite audio signal, audio artefacts formed as a result of truncating an audio signal, audio artefacts arising in an audio signal from turning a microphone (for example, microphone 12) on, audio artefacts arising in an audio signal from turning a microphone (for example, microphone 12) off.

Thus, in step 64 in the method of FIG. 6, the composite audio signal is analysed to identify audio artefacts associated with concatenation in the composite audio signal.

The audio artefact processing block 52 may be configured to compensate for the identified audio artefacts to form a corrected composite audio signal. In this example, the audio artefact processing block 52 is configured to compensate for the identified audio artefacts to form a corrected composite sample representing speech. In some examples, compensating for the identified audio artefacts may comprise removing the identified audio artefacts from the composite audio signal.

An example embodiment of the audio artefact processing block 52 is described in greater detail below.

Thus, in step 66 in the method of FIG. 6, the identified audio artefacts are compensated for, in order to form a corrected composite audio signal.

The corrected composite audio signal may then be passed to a block 54 for further processing of the signal. In this example, the corrected composite sample representing speech may be passed to a voice biometrics block 54. The voice biometrics block 54 may be configured to execute one or more speaker recognition processes using the corrected composite audio signal. For example, the voice biometrics block 54 may use the corrected composite audio signal in a speaker enrolment process. For example, the voice biometrics block 54 may use the corrected composite audio signal to form a model of the speech of the user. By using the corrected composite audio signal to form a model of the speech of the user, the model will not comprise the audio artefact as a discriminative part of the user's speech. Thus, the model will be a more accurate representation of the speech of the user.

Alternatively, the voice biometrics block 54 may use the corrected composite audio signal in a speaker verification process. For example, the voice biometrics block 54 may use corrected composite audio signal to verify the identity of the individual who provided the speech. Thus, the speaker verification process is more likely to reliably identify a user, as the corrected composite audio signal will be more representative of the speech of the user following the compensation of the audio artefacts.

Alternatively, the voice biometrics block 54 may comprise a voice activity detector. The voice activity detector may be configured to receive the corrected composite audio signal. Thus, the voice activity detector is more likely to reliably detect voice activity, as audio artefacts which may have resulted in the voice activity detector misfiring have been compensated for in the corrected composite audio signal.

Thus, in step 68 of the method of FIG. 6, the corrected composite audio signal is provided to a voice biometrics module.

While the method described above relates to a method of audio processing, in which the received audio samples represent speech, and in which the corrected composite audio signal is provided to a voice biometrics module, it will be appreciated that the corrected composite audio signal may be provided to any subsequent processing or playback module or system for example a speech recognition system, and moreover that the same techniques may be applied to any received audio samples, and the corrected composite audio signal may be provided to any subsequent processing or playback module or system.

Figure 7:
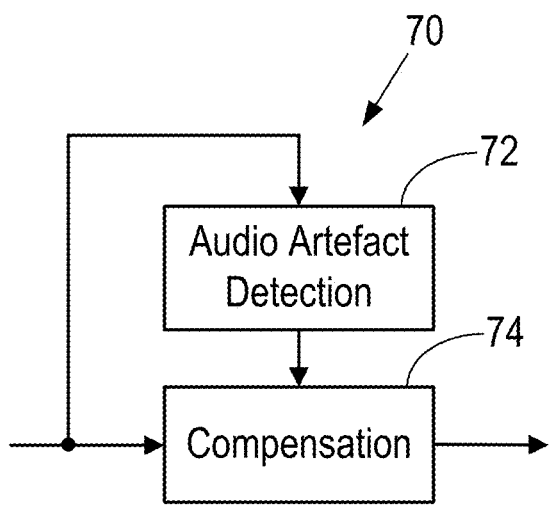
FIG. 7 is an example of an audio artefact processing system.

FIG. 7 shows an example of an audio artefact processing system 70. The audio artefact processing system may be comprised within the audio artefact processing block 52 of FIG. 5.

Although one possible embodiment of an audio artefact processing system 70 has been described below, it will be appreciated that the audio artefact processing system may be configured to perform any suitable method to analyse a composite audio signal to identify audio artefacts associated with concatenation in the composite audio signal, and may be configured to perform any suitable method to compensate for the identified audio artefacts to form a corrected composite audio signal.

In FIG. 7, an audio signal is passed to an audio artefact detection block 72. The audio signal described with reference to this illustrated example may be the composite audio signal as described with reference to FIG. 5. The audio artefact detection block 72 may analyse the composite audio signal to identify audio artefacts associated with concatenation in the composite audio signal. In some examples, the audio artefact detection block 72 may be configured to identify a pop or click in the composite audio signal. Additionally or alternatively, the audio artefact detection block 72 may be configured to identify any of the following: an audio artefact that has formed as a result of a concatenation process to form the composite audio signal, an audio artefact that has formed as a result of truncating an audio signal, an audio artefact arising in an audio signal from turning a microphone (for example, microphone 12) on, an audio artefact arising in an audio signal from turning a microphone (for example, microphone 12) off.

In some examples, the audio artefact detection block 72 may be configured to analyse the composite audio signal to identify audio artefacts associated with concatenation in the composite audio signal by monitoring an energy level of the composite audio signal, and by monitoring changes in a tracking envelope of the composite audio signal. Following this, the audio artefact detection block 72 may be configured to identify audio artefacts associated with concatenation based on both the monitored energy level of the composite audio signal and the monitored changes in the tracking envelope of the composite audio signal.

An example embodiment of the audio artefact detection block 72 is described in greater detail below.

Following the identification of one or more audio artefacts associated with concatenation in the composite audio signal, the composite audio signal may be passed to a compensation block 74. The compensation block 74 may be configured to compensate for the identified audio artefacts to form a corrected composite audio signal. In some examples, the compensation block 74 may be configured to compensate for the identified audio artefacts by removing the identified audio artefacts from the composite audio signal. In some examples, the compensation block 74 may be configured to compensate for the identified audio artefacts to form a corrected composite audio signal by applying a variable gain to the composite audio signal. An example method for compensating for an audio artefact in a composite audio signal is described in greater detail below.

The corrected composite audio signal may then be passed from the compensation block 74 to the voice biometrics block 54 of FIG. 5.

Figure 8:
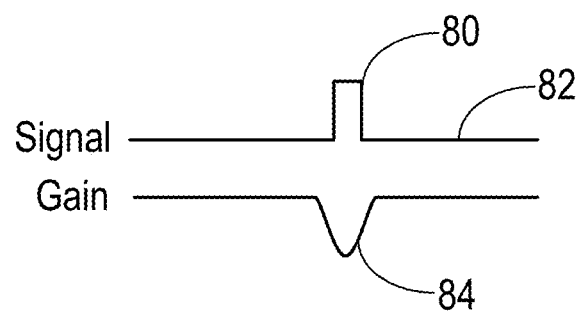
FIG. 8 illustrates one possible method of compensating for an audio artefact in an audio signal.

FIG. 8 illustrates one possible method for compensating for an audio artefact in an audio signal.

Specifically, FIG. 8 illustrates a situation where an unwanted audio artefact 80 is present within an audio signal 82, and FIG. 8 also shows that the audio artefact 80 may be compensated by applying a time-variable gain 84 to the audio signal 82. The time-variable gain 84 may be of any suitable form that allows an audio artefact to be compensated for within an audio signal. By choosing a time-variable gain 84 to be applied to the audio signal 82 such that it is has a form and magnitude that are approximately equivalent (but inverted) to the form and magnitude of the audio signal 82 over the time period in which the audio artefact 80 is present, a corrected audio signal can be formed in which the audio artefact has been compensated for. The compensation may result in the period over which the audio artefact 80 was present resembling the background level of the audio signal 82.

In some embodiments, the variable gain 84 may have a Gaussian profile. A Gaussian profile may be selected to avoid the introduction of audible effects in the corrected audio signal. For example, a variable gain 84 comprising a Gaussian profile may prevent the introduction of artificially fast edges in the corrected audio signal (which may impact later processing or use of the corrected audio signal).

The required magnitude of the variable gain profile 84 can be determined from the tracking envelope of the audio signal.

In some embodiments, the variable gain 84 may be of a form such that the variable gain 84 does not attenuate the audio signal 82 in such a way that the amplitude of the audio signal falls below the background noise level. This may prevent the introduction of audible effects in the corrected audio signal (which may impact later processing or use of the corrected audio signal). For example, this form of the variable gain 84 may prevent the period of the corrected audio signal over which the audio artefact was initially present from becoming an unnaturally low amplitude (in comparison to the remainder of the audio signal). In other embodiments, the variable gain 84 may be chosen to fade the resulting corrected signal to zero magnitude, for example −60 dB or −70 dB full scale.

The duration of the variable gain profile 84 may for example be of the order of hundreds of milliseconds, which is long enough to cover most fast edges that are of interest. Signals that change more slowly than this are probably not of interest because they may be genuine audio signals.

Figure 9:
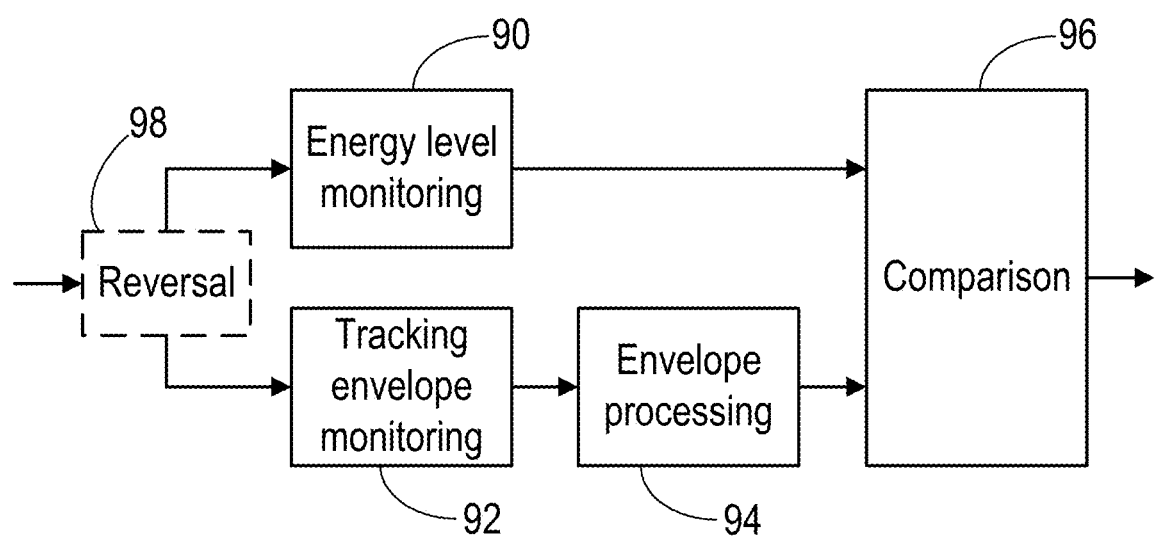
FIG. 9 is an example of an audio artefact detection system.

FIG. 9 shows an example of an audio artefact detection system. The audio artefact detection system may be comprised within the audio artefact detection block 72 of FIG. 7.

In FIG. 9, an audio signal is received. The received audio signal described with reference to this illustrated example may be the composite audio signal as described with reference to FIG. 5. This received audio signal is passed to an energy level monitoring block 90. In parallel to passing the composite audio signal to the energy level monitoring block 90, the composite audio signal is also passed to a tracking envelope monitoring block 92.

In this example, the energy level monitoring block 90 is configured to monitor an energy level of the composite audio signal by forming a signal that represents the energy of the composite audio signal. In this example, the energy level signal provides an indication of the average energy of the composite audio signal over a predetermined period. In one example, the energy level monitoring block 90 may have an attack time constant of 100 Hz-500 Hz, for example 250 Hz (i.e. 10 ms-2 ms, for example 4 ms), in order to be suitable for monitoring the energy in speech. The energy level monitoring block 90 may have an effectively infinitely fast decay time constant.

The energy level monitoring block 90 may provide as its output a value representing the energy level of the composite audio signal. For example, this may be the magnitude of the energy signal generated in a particular sample period using the relevant time constants mentioned above, or an average magnitude of the energy signal over a predetermined number of sample periods.

In this example, the tracking envelope monitoring block 92 is configured to track the level of the composite audio signal. In one example, the tracking envelope monitoring block 92 may have an effectively infinitely fast attack time constant. The tracking envelope monitoring block 92 may have a decay time constant of 100 Hz-500 Hz, for example 250 Hz (i.e. 10 ms-2 ms, for example 4 ms), in order to be suitable for tracking speech.

The detected tracking envelope is passed to an envelope processing block 94. The envelope processing block 94 is configured to determine a parameter associated with the signal tracking envelope of the composite audio signal. In a specific embodiment, the envelope processing block 94 is configured to determine a rate at which the signal tracking envelope is changing. For example, the envelope processing block 94 may be configured to determine the change in magnitude of the signal tracking envelope over a predetermined number of sample periods. More specifically, in an example in which the tracking envelope monitoring block 92 has an effectively infinitely fast attack time constant, the envelope processing block 94 may measure the change in magnitude of the signal tracking envelope between two consecutive sample periods.

As noted above, the energy level monitoring block 90 and the tracking envelope monitoring block 92 will be formed with respective attack time constants, and respective decay time constants. In general, the signal tracking envelope monitoring block 92 will have a faster attack time constant than the attack time constant of the energy level monitoring block 90.

Where the composite audio signal is a composite sample representing speech (as described with reference to FIG. 5) the respective attack time constants and the respective decay time constants of the energy level monitoring block 90 and the tracking envelope monitoring block 92 will be of a suitable duration to monitor a speech signal. However, it will be appreciated that the respective attack time constants and the respective decay time constants can be selected such that any desired composite signal may be suitably monitored.

In some examples, the outputs of the energy level monitoring block 90 and the envelope processing block 94 for each sample period may then be passed to a comparison block 96. As mentioned above, these outputs may be instantaneous values, or may be averages derived from the relevant signals.

The comparison block 96 may be configured to identify audio artefacts associated with concatenation based on both the monitored energy level of the composite audio signal and the monitored rate of change of the tracking envelope of the composite audio signal. Specifically, this may be determined by comparing the energy level parameter with a first threshold level, and comparing the rate of change of the signal tracking envelope with a second threshold level.

Specifically, in some embodiments it is determined that the composite audio signal contains an audio artefact when (a) the energy level parameter related to the monitored energy level of the composite audio signal is below the first threshold, and (b) the monitored rate of change of the tracking envelope of the composite audio signal is above the second threshold.

The reasoning is that it is signals, with a high rate of change of the tracking envelope of the signal, that are potentially problematic, in that they might represent an audio artefact. However, a high rate of change of the tracking envelope might also be a feature of a genuine signal with no audio artefact, but in this case the signal will generally persist for a significant time, and so it will usually be associated with a high energy level in the signal. Thus, the process of identifying highly transient audio artefacts can be considered to be a process of identifying occasions when a high rate of change of the tracking envelope is associated with a low energy level in the signal.

Thus, the value of the first threshold may be set by considering a reasonable speech level, for example 60-70 dB SPL at the microphone. Signals below that level are unlikely to be problematic.

In some embodiments, the second threshold may be defined with reference to a maximum expected slew rate, i.e. a maximum expected rate of change of the signal per unit time. Then, if the rate of change of the signal tracking envelope exceeds the second threshold, then this may indicate that the magnitude of the signal tracking envelope has changed faster than the maximum allowable slew rate for the composite audio signal. It will be appreciated that the maximum expected, or maximum allowable, slew rate (which can be used in selecting the second threshold) may be dependent on the expected content of the composite audio signal. For example, in the case of a speech signal, the highest frequency component expected in the signal may for example be at, say 2 kHz, and so this will determine the maximum expected, or maximum allowable, slew rate for the signal tracking envelope, as discussed above. However, for a signal containing different sounds, the highest frequency component expected in the signal may be at a different frequency, and so this will mean that the maximum expected slew rate will be different.

In some embodiments, rather than compare the monitored rate of change of the tracking envelope of the composite audio signal and the energy level parameter to separate thresholds, a combined parameter may be formed. For example, the ratio of the rate of change of the tracking envelope, and the energy level parameter may be formed, and this combined parameter may be compared to a third threshold level. In response to the ratio of the rate of change of the signal tracking envelope, and the energy level parameter exceeding the third threshold level, an audio artefact may be identified in the composite audio signal. For example, the third threshold level may be set to a value of $2\ s^{-1}$, with an audio artefact being identified if the combined parameter exceeds that value. The third threshold level could be set more aggressively, for example to $1.5\ s^{-1}$, but that risks the possibility that genuine speech, such as sibilants and/or fricatives, would exceed the threshold. More generally, the third threshold level may be based on the maximum allowable slew rate of the composite audio signal. As described above, the maximum allowable slew rate may be dependent on the content of the composite audio signal.

Thus, by analysing the composite audio signal in this manner, one or more audio artefacts may be identified in the composite audio signal.

In some embodiments, the audio artefact detection system as illustrated in FIG. 9 may be configured to reverse a composite audio signal, and then further configured to perform processing on said reversed audio signal. Said reversal of the composite audio signal may occur in an optional signal reversal block 98. The composite audio signal described with reference to this illustrated example may be the composite audio signal as described with reference to FIG. 5. The audio artefact detection system may then analyse the reversed composite audio signal to identify audio artefacts associated with concatenation in the composite audio signal in substantially the same manner as described above.

In some embodiments, the audio artefact detection system as illustrated in FIG. 9 may be configured both to analyse the composite audio signal to identify audio artefacts associated with concatenation in the composite audio signal, and also to analyse the reversed composite audio signal to identify audio artefacts associated with concatenation in the composite audio signal.

Such a configuration of the audio artefact detection system may be advantageous in the detection of the "clip at end" and "clip at start" events (as described above).

For example, in a "clip at start" scenario, the magnitude of the signal tracking envelope of the composite audio signal will "jump" at the time the clip is present in the composite audio signal, whereas the energy tracking envelope of the composite audio signal will remain at a relatively low magnitude (as described above). It will be appreciated that for a "clip at end" scenario, the signal tracking envelope of the composite audio signal will "drop" at the time the clip is present in the composite audio signal, whereas the energy tracking envelope of the composite audio signal will remain at a relatively high magnitude. Thus, in this example, where the "clip at start" event will likely be detected as an audio artefact in substantially the same manner as described above, the "clip at end" event will not. For the "clip at end" scenario, although the rate of change of the signal tracking envelope will exceed the second threshold (as the magnitude of the signal will significantly decrease in a relatively short period of time), as a signal of relatively large magnitude will have been being received for a relatively long period of time, the parameter of the energy tracking envelope may be above the first threshold (as the average energy of the signal will be relatively large). Thus, the "clip at end" audio artefact will not be identified in this example.

However, by reversing the composite audio signal, it will be appreciated that a "clip at end" scenario in the composite audio signal, will become equivalent to a "clip at start event" in the reversed composite audio signal. Thus, by analysing the reversed composite audio signal in substantially the same manner as described above, the rate of change of the signal tracking envelope will exceed the second threshold, the parameter of the energy tracking envelope will be below the first threshold, and thus the "clip at start" scenario in the reversed composite audio signal will be able to be identified as an audio artefact.

The compensation block 74 of FIG. 7 may be configured, following the identification of an audio artefact in a reversed audio signal by the audio artefact detection system of FIG. 9, to compensate for the corresponding audio artefact in the audio signal that has not been reversed.

Thus, by analysing both the composite audio signal and the reversed composite audio signal in this manner, both "clip at start" and "clip at end" audio artefacts may be identified in the composite audio signal.

Figure 10:
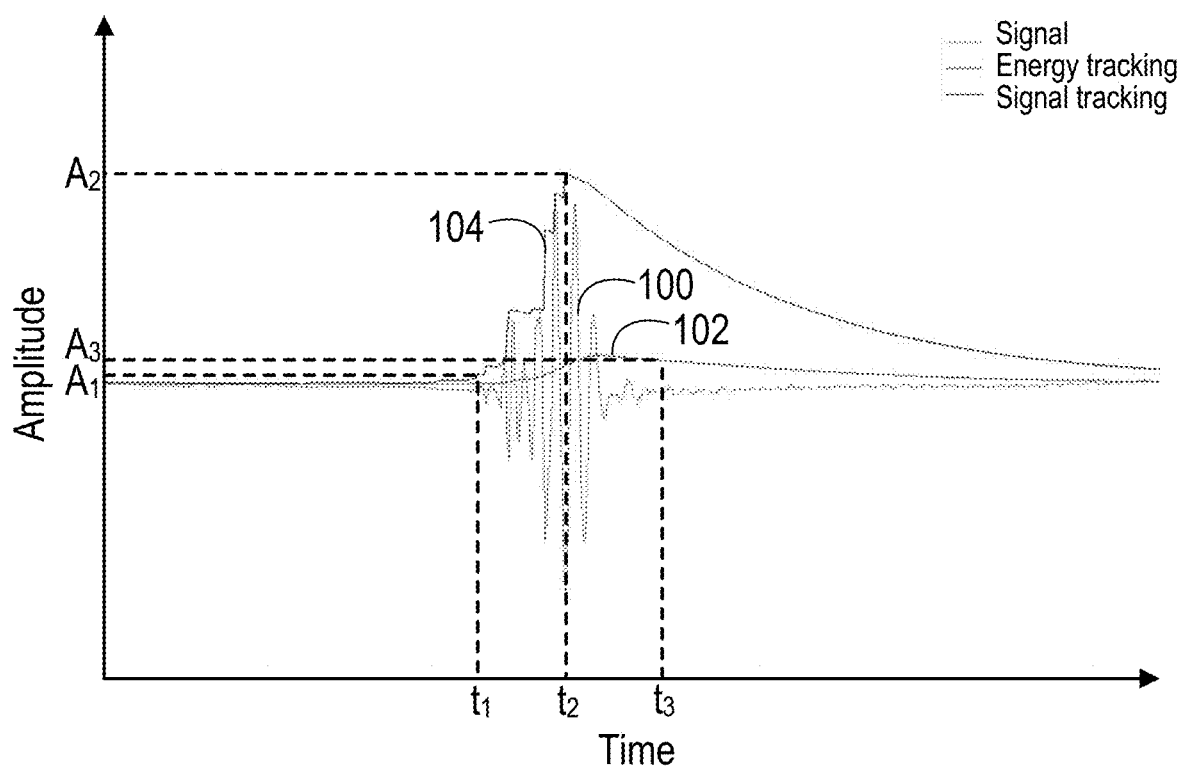
FIG. 10 illustrates an example of a formed energy tracking envelope and a formed signal tracking envelope for an audio signal comprising an audio artefact.

FIG. 10 illustrates the operation of the method described above, for an audio signal comprising an audio artefact.

Specifically, FIG. 10 shows a received signal 100 over a period of time. The amplitude of signal 100 is above the background level $A_1$ for a period of about 150 audio sample periods (i.e. about 3 ms for a signal with a 48 kHz sample rate). FIG. 10 also shows the energy tracking signal 102 and the signal tracking envelope 104.

Up until the time indicated by $t_1$, only noise is present within the audio signal. Thus, the amplitude of the formed energy tracking signal 102, the amplitude of the formed signal tracking envelope 104 and the amplitude of the signal 100 remain at $A_1$. The time indicated by $t_1$ marks the beginning of the audio artefact within the audio signal, and thus the amplitude of the audio signal 100 begins to rapidly increase. As a result of this, the amplitude of the energy tracking signal 102 also begins to increase. However, as the energy tracking envelope has a relatively slow attack time constant (in comparison to the attack time constant of the signal tracking envelope), the amplitude of the energy tracking envelope 102 increases at a considerably slower rate than the rate at which the amplitude of the signal 100 increases. As mentioned above, it will be appreciated that in order for the amplitude of the energy tracking envelope 102 to significantly increase, a signal 100 with an amplitude that is above the background noise level must be received for a significant period of time.

At the time $t_1$, the amplitude of the signal tracking envelope 104 also begins to increase. In this example, the signal tracking envelope has an "infinitely fast" time constant, by which is meant that the amplitude of the signal tracking envelope 104 will increase to the value of the amplitude of the signal 100 within one sample period. Therefore, as the amplitude of the signal 100 continues to increase to the value of $A_2$ at time $t_2$, the amplitude of the signal tracking envelope 104 also increases to the value of $A_2$. In contrast to this, the amplitude of the energy tracking envelope 102 will only increase to the value of $A_3$.

After time $t_2$, the amplitude of the signal 100 begins to decrease. At this point, both the amplitudes of both the signal tracking envelope 104 and the energy tracking envelope 102 begin to decrease. However, both the signal tracking envelope 104 and the energy tracking envelope 102 comprise finite decay time constants. In this example, the decay time constant of the energy tracking envelope is slower than the attack time constant of the energy tracking envelope; and the decay time constant of the signal tracking envelope is slower than the attack time constant of the signal tracking envelope.

Thus, in this example, the amplitude of the energy tracking envelope, and the amplitude of the signal tracking envelope, decay relatively slowly in comparison to the rate at which the amplitude of the signal decays. It is illustrated that at time $t_3$, the amplitude of the signal has decayed to amplitude $A_1$, the background noise level, whereas both the amplitude of the signal tracking envelope and the amplitude of the energy tracking envelope are significantly greater than this value.

Thus, at time $t_2$, it is illustrated that the amplitude of the signal tracking envelope, $A_2$, has increased significantly. For example, the rate of change of the signal tracking envelope may be defined to be the change in the amplitude of the signal tracking envelope 104 between time $t_1$ and time $t_2$, i.e. $A_2$-$A_1$, or may be defined to be the largest change in any one sample period during this time. Since the signal tracking envelope 104 is increasing relatively fast during this time, the monitored rate of change of the tracking envelope of the composite audio signal may be above the second threshold mentioned above.

In this example, the parameter of the energy tracking envelope may be defined to be the amplitude of the energy tracking envelope 102 at each time, for example the time $t_2$, i.e. $A_3$. Since the energy level never reaches a high level, the parameter related to the monitored energy level of the composite audio signal is below the first threshold mentioned above.

Thus, in this example, the rate of change of the signal tracking envelope 104 may exceed the second threshold, and the parameter of the energy tracking envelope 102 may fail to exceed the first threshold, and hence an audio artefact may be identified within the audio signal Thus, in this example, when an audio artefact is present in the audio signal, the amplitude of the signal tracking envelope, which provides an indication of change in the energy level of the signal, "jumps" to a large amplitude in a relatively small number of sample periods, whereas the amplitude of the energy tracking envelope, which provides an indication of the average energy level of the signal, will not increase significantly, as a signal with an amplitude that exceeds the background noise level has only been received for a short period of time.

Figure 11:
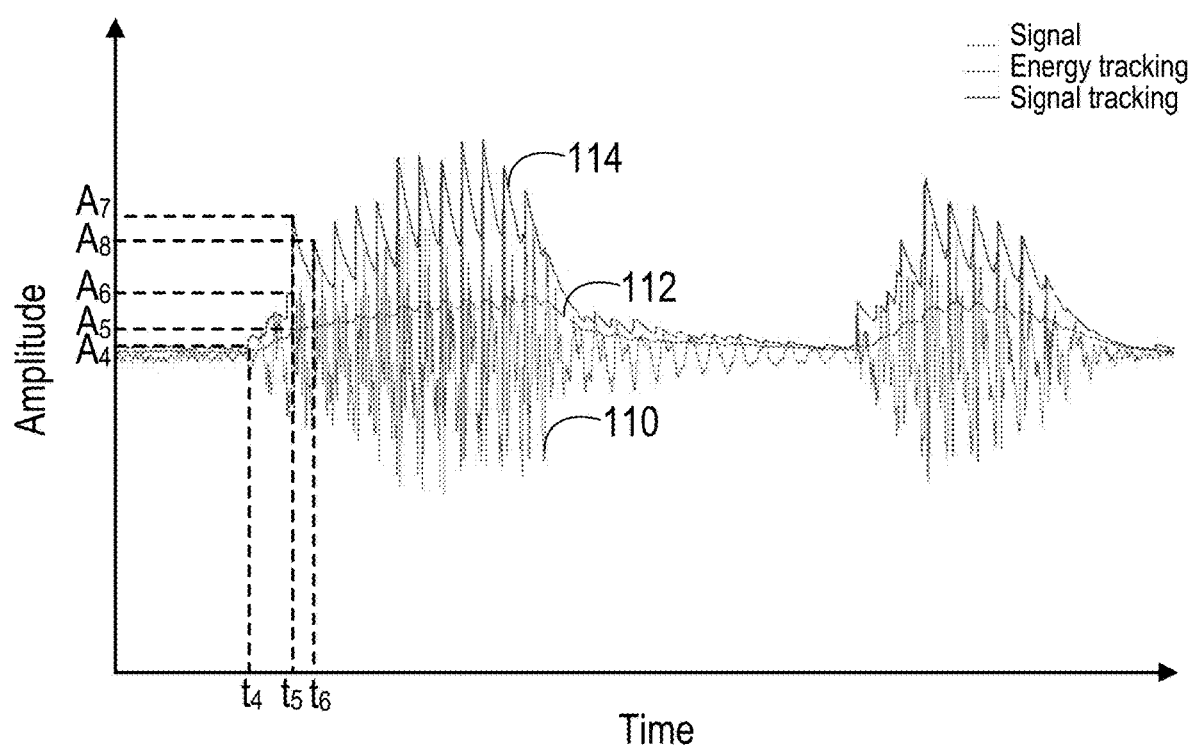
FIG. 11 illustrates an example of a formed energy tracking envelope and a formed signal tracking envelope for an audio signal comprising speech.

In contrast, FIG. 11 illustrates the operation of the method described above, for an audio signal comprising speech.

Specifically, FIG. 11 shows a received signal 110 over a period of time. The signal 110 contains two bursts where the amplitude is above the background level $A_4$ and each burst has a duration of about 2000 audio sample periods (i.e. about 40 ms for a signal with a 48 kHz sample rate). (Thus, the time scale in FIG. 11 is considerably longer than the time scale in FIG. 10.) FIG. 11 also shows the energy tracking signal 112 and the signal tracking envelope 114.

Up until the time indicated by $t_4$, only noise is present within the audio signal. Thus, the amplitude of the formed energy tracking signal 112, the amplitude of the formed signal tracking envelope 114 and the amplitude of the signal 110 remain at $A_4$. The time indicated by $t_4$ marks the beginning of the speech signal. Thus, at time $t_4$, the amplitude of the signal 110 begins to increase. It can be appreciated that the increase in the amplitude of the signal at the beginning of a speech segment over a defined number of sample periods, may be less than the increase in the amplitude of the signal at the beginning of an audio artefact over the same number of sample periods. As illustrated, the amplitude of the speech signal continues to gradually increase up to the value indicated by $A_6$ immediately before time $t_5$. At this point, the amplitude of the energy tracking envelope has also risen to the amplitude indicated by $A_5$. It will be appreciated that as a signal with an amplitude above the background noise level has been being received for a significant period of time, the amplitude of the energy tracking envelope has increased by a relatively large amount, and it continues to increase as the speech burst continues, despite the relatively slow attack time constant of the energy tracking envelope (in contrast to the amplitude $A_2$, which indicates an example of the amplitude that may be reached by the energy tracking envelope when an audio artefact is present within an audio signal).

At time $t_5$, there is a significant jump in the amplitude of the speech signal 110, to the amplitude indicated by $A_7$. As the signal tracking envelope comprises an effectively infinitely fast attack time constant, the amplitude of the signal tracking envelope 114 also increases to the amplitude indicated by $A_7$. As the energy tracking envelope 112 comprises a relatively slow attack time constant, the amplitude of the energy tracking envelope does not significantly increase.

However, in this scenario, as a speech signal has been received for a significant period of time prior to the jump in the amplitude of the speech signal at the time $t_5$, the amplitude of the energy tracking envelope is relatively high (in comparison to the amplitude indicated by $A_3$ in the example of FIG. 9). Thus, the change in the amplitude of the signal tracking envelope 114 given by $A_7$-$A_6$ is not significantly greater than the change in amplitude given by $A_2$-$A_1$ in FIG. 9, while the amplitude $A_5$ of the energy tracking envelope 112 is significantly greater than the amplitude of the energy tracking envelope given by $A_3$ in FIG. 10. Therefore, in this illustrated example, even if the rate of change of the signal tracking envelope does exceed the second threshold, the parameter of the energy tracking envelope exceeds the first threshold, and thus (despite the jump in the amplitude of the speech signal at time $t_5$), an audio artefact is not identified in the audio signal.

The amplitude of the speech signal then decreases below the amplitude indicated by $A_7$, and thus the amplitude of the signal tracking envelope begins to decay. In this example, the signal tracking envelope comprises a faster decay time constant than the energy tracking envelope, but it will appreciated that this may not always be the case. However, as a speech signal with an amplitude greater than the current amplitude of the energy tracking envelope is continuing to be received, the amplitude of the energy tracking envelope continues to increase. At time $t_6$, the amplitude of the speech signal 110 again jumps to a value which exceeds the current magnitude of the signal tracking envelope 114, and thus the amplitude of the signal tracking envelope 114 increases to the match the amplitude of the speech signal, as indicated by $A_8$. Again, despite this jump in the amplitude of the speech signal 110 (and thus the corresponding jump in the amplitude of the signal tracking envelope 114), as the amplitude of the energy tracking envelope 112 is relatively high, an audio artefact is again not identified in the audio signal.

Thus, expected increases in the amplitude of a received speech signal will not be falsely identified as audio artefacts.

Thus, a method and system which can reliably identify and compensate for audio artefacts within audio signals are provided.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of audio processing, the method comprising:
receiving a plurality of audio samples;
concatenating the plurality of audio samples to form a composite audio signal;
analysing the composite audio signal to identify audio artefacts associated with concatenation in the composite audio signal, wherein analysing comprises:
monitoring an energy level of the composite audio signal;
monitoring a rate of change of a tracking envelope of the composite audio signal; and
identifying audio artefacts associated with concatenation based on both the monitored energy level of the composite audio signal and the monitored rate of change of the energy level of the composite audio signals;
compensating for the identified audio artefacts to form a corrected composite audio signal; and
providing the corrected composite audio signal to a voice biometrics module.

2. A method according to claim 1, wherein the step of analysing the composite audio signal to identify audio artefacts associated with concatenation in the composite audio signal comprises:
identifying a pop or click in the composite audio signal.

3. A method according to claim 1, wherein the step of monitoring an energy level of the composite audio signal comprises:
forming an energy tracking envelope of the composite audio signal.

4. A method according to claim 1, wherein the step of monitoring a rate of change of the energy level of the composite audio signal comprises:
forming a signal tracking envelope of the composite audio signal; and
determining a rate of change of the signal tracking envelope of the composite audio signal.

5. A method according to claim 4, wherein the signal tracking envelope has a faster attack time constant than the energy tracking envelope.

6. A method according to claim 4,
wherein the step of monitoring an energy level of the composite audio signal comprises forming an energy tracking envelope of the composite audio signal, and
wherein the step of identifying audio artefacts associated with concatenation based on both the monitored energy level of the composite audio signal and monitored rate of change of the energy level of the composite audio signal comprises:
determining whether a parameter of the energy tracking envelope exceeds a first threshold level;
determining whether the rate of change of the signal tracking envelope exceeds a second threshold level; and
responsive to the parameter of the energy tracking envelope not exceeding the first threshold level, and the rate of change of the signal tracking envelope exceeding the second threshold level, identifying an audio artefact.

7. A method according to claim 6, wherein the second threshold level is set based on a maximum expected slew rate of the composite audio signal.

8. A method according to claim 4,
wherein the step of monitoring an energy level of the composite audio signal comprises forming an energy tracking envelope of the composite audio signal, and
wherein the step of identifying audio artefacts associated with concatenation based on both the monitored energy level of the composite audio signal and monitored rate of change of the energy level of the composite audio signal comprises
determining whether the ratio of the rate of change of the signal tracking envelope and a parameter of the energy tracking envelope exceeds a third threshold level; and
responsive to the ratio of the rate of change of the signal tracking envelope and the parameter of the energy tracking envelope exceeding the third threshold level, identifying an audio artefact.

9. A method according to claim 1, wherein the plurality of audio samples represent speech.

10. A method according to claim 9, wherein the plurality of samples representing speech are received from a speaker diarisation process.

11. A method according to claim 9, wherein the plurality of samples representing speech comprise a plurality of utterances received from multiple different sessions where an individual has provided speech to the system.

12. A method according to claim 1, wherein the step of compensating for the identified audio artefacts to form a corrected composite audio signal comprises:
applying a time-variable gain to the composite audio signal.

13. A method according to claim 12, wherein the time-variable gain comprises a Gaussian profile.

14. A method according to claim 1, wherein the method further comprises:
using the corrected composite audio signal in a speaker enrolment process.

15. A method according to claim 1, wherein the method further comprises:
using the corrected composite audio signal in a speaker verification process.

16. A system for audio processing, the system comprising:
an input for receiving a plurality of audio samples;
a processor, wherein the processor is configured for:
concatenating the plurality of audio samples to form a composite audio signal;
analysing the composite audio signal to identify audio artefacts associated with concatenation in the composite audio signal, wherein analysing comprises:
monitoring an energy level of the composite audio signal;

monitoring a rate of change of a tracking envelope of the composite audio signal; and identifying audio artefacts associated with concatenation based on both the monitored energy level of the composite audio signal and the monitored rate of change of the energy level of the composite audio signal;

compensating for the identified audio artefacts to form a corrected composite audio signal; and an output for providing the corrected composite audio signal to a voice biometrics module.

17. A system according to claim 16, further comprising a voice biometrics module connected to said output.

18. A computer program product, comprising a non-transitory computer-readable medium, containing instructions for causing a suitably programmed processor to perform a method comprising:

receiving a plurality of audio samples;

concatenating the plurality of audio samples to form a composite audio signal;

analysing the composite audio signal to identify audio artefacts associated with concatenation in the composite audio signal, wherein analysing comprises:

monitoring an energy level of the composite audio signal;

monitoring a rate of change of a tracking envelope of the composite audio signal; and identifying audio artefacts associated with concatenation based on both the monitored energy level of the composite audio signal and the monitored rate of change of the energy level of the composite audio signal;

compensating for the identified audio artefacts to form a corrected composite audio signal; and providing the corrected composite audio signal to a voice biometrics module.

19. A method of audio processing, the method comprising:

receiving a plurality of audio samples;

concatenating the plurality of audio samples to form a composite audio signal;

analysing the composite audio signal to identify audio artefacts associated with concatenation in the composite audio signal;

compensating for the identified audio artefacts to form a corrected composite audio signal; and providing the corrected composite audio signal to a voice biometrics module;

reversing the composite audio signal; and analysing the reversed composite audio signal to identify audio artefacts associated with concatenation in the composite audio signal.

20. A method according to claim 19, wherein the step of analysing the composite audio signal to identify audio artefacts associated with concatenation in the composite audio signal comprises:

monitoring an energy level of the composite audio signal;

monitoring a rate of change of a tracking envelope of the composite audio signal; and identifying audio artefacts associated with concatenation based on both the monitored energy level of the composite audio signal and the monitored rate of change of the energy level of the composite audio signal.

21. A method according to claim 20, wherein the step of monitoring an energy level of the composite audio signal comprises:

forming an energy tracking envelope of the composite audio signal.

22. A method according to claim 20, wherein the step of monitoring a rate of change of the energy level of the composite audio signal comprises:

forming a signal tracking envelope of the composite audio signal; and determining a rate of change of the signal tracking envelope of the composite audio signal.

23. A method according to claim 22, wherein the signal tracking envelope has a faster attack time constant than the energy tracking envelope.

24. A method according to claim 22, wherein the step of monitoring an energy level of the composite audio signal comprises forming an energy tracking envelope of the composite audio signal, and wherein the step of identifying audio artefacts associated with concatenation based on both the monitored energy level of the composite audio signal and monitored rate of change of the energy level of the composite audio signal comprises:

determining whether a parameter of the energy tracking envelope exceeds a first threshold level;

determining whether the rate of change of the signal tracking envelope exceeds a second threshold level; and responsive to the parameter of the energy tracking envelope not exceeding the first threshold level, and the rate of change of the signal tracking envelope exceeding the second threshold level, identifying an audio artefact.

25. A method according to claim 24, wherein the second threshold level is set based on a maximum expected slew rate of the composite audio signal.

26. A method according to claim 22, wherein the step of monitoring an energy level of the composite audio signal comprises forming an energy tracking envelope of the composite audio signal, and wherein the step of identifying audio artefacts associated with concatenation based on both the monitored energy level of the composite audio signal and monitored rate of change of the energy level of the composite audio signal comprises:

determining whether the ratio of the rate of change of the signal tracking envelope and a parameter of the energy tracking envelope exceeds a third threshold level; and responsive to the ratio of the rate of change of the signal tracking envelope and the parameter of the energy tracking envelope exceeding the third threshold level, identifying an audio artefact.

27. A method according to claim 19, wherein the plurality of audio samples represent speech.

28. A method according to claim 27, wherein the plurality of samples representing speech are received from a speaker diarisation process.

29. A method according to claim 27, wherein the plurality of samples representing speech comprise a plurality of utterances received from multiple different sessions where an individual has provided speech to the system.

30. A method according to claim 19, wherein the step of compensating for the identified audio artefacts to form a corrected composite audio signal comprises:

applying a time-variable gain to the composite audio signal.

31. A method according to claim 30, wherein the time-variable gain comprises a Gaussian profile.

32. A method according to claim 19, wherein the method further comprises:
 using the corrected composite audio signal in a speaker enrolment process.

33. A method according to claim 19, wherein the method further comprises:
 using the corrected composite audio signal in a speaker verification process.

34. A system for audio processing, the system comprising:
 an input for receiving a plurality of audio samples;
 a processor, wherein the processor is configured for:
  concatenating the plurality of audio samples to form a composite audio signal;
  analysing the composite audio signal to identify audio artefacts associated with concatenation in the composite audio signal; and
  compensating for the identified audio artefacts to form a corrected composite audio signal;
  reversing the composite audio signal; and
  analysing the reversed composite audio signal to identify audio artefacts associated with concatenation in the composite audio signal; and
 an output for providing the corrected composite audio signal to a voice biometrics module.

35. A system according to claim 34, further comprising a voice biometrics module connected to said output.

36. A computer program product, comprising a non-transitory tangible computer-readable medium, containing instructions for causing a suitably programmed processor to perform a method comprising:
 receiving a plurality of audio samples;
 concatenating the plurality of audio samples to form a composite audio signal;
 analysing the composite audio signal to identify audio artefacts associated with concatenation in the composite audio signal;
 compensating for the identified audio artefacts to form a corrected composite audio signal; and
 providing the corrected composite audio signal to a voice biometrics module;
 reversing the composite audio signal; and
 analysing the reversed composite audio signal to identify audio artefacts associated with concatenation in the composite audio signal.

* * * * *

UNITED STATES PATENT AND TRADEMARK OFFICE
CERTIFICATE OF CORRECTION

PATENT NO. : 10,720,171 B1
APPLICATION NO. : 16/280288
DATED : July 21, 2020
INVENTOR(S) : Lesso et al.

It is certified that error appears in the above-identified patent and that said Letters Patent is hereby corrected as shown below:

In the Specification

1. In Column 5, Line 20, delete "device" and insert -- device. --, therefor.

2. In Column 5, Line 47, delete "first sample 32 and the second sample 34" and insert -- first sample 34 and the second sample 36 --, therefor.

3. In Column 15, Line 9, delete "signal" and insert -- signal. --, therefor.

In the Claims

4. In Column 17, Line 39, in Claim 1, delete "signals;" and insert -- signal; --, therefor.

5. In Column 22, Line 6, in Claim 36, delete "tangible computer-readable medium," and insert -- computer-readable medium, --, therefor.

Signed and Sealed this
Twentieth Day of September, 2022

Katherine Kelly Vidal
*Director of the United States Patent and Trademark Office*